A. T. SAUNDERS.
APPARATUS FOR TESTING COMPLEX LIQUIDS.
APPLICATION FILED JULY 31, 1916.

Patented June 24, 1919.

WITNESSES:

INVENTOR.

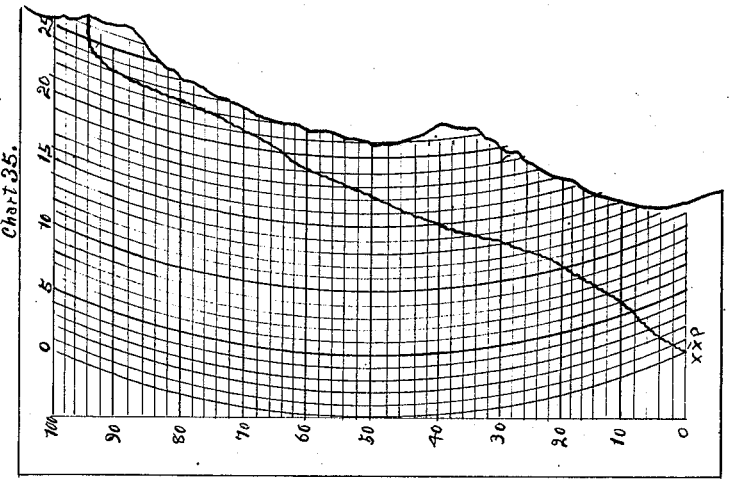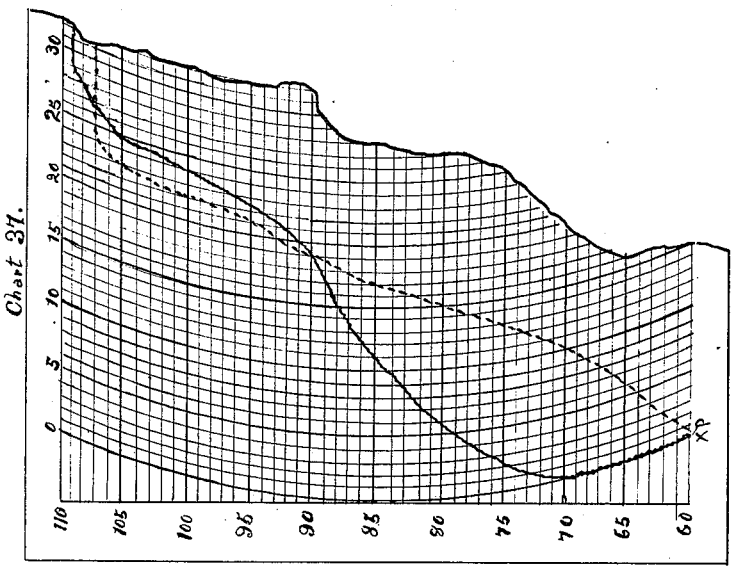

UNITED STATES PATENT OFFICE.

ADDISON T. SAUNDERS, OF CHICOPEE, MASSACHUSETTS.

APPARATUS FOR TESTING COMPLEX LIQUIDS.

1,307,601.  Specification of Letters Patent.  Patented June 24, 1919.

Application filed July 31, 1916. Serial No. 112,271.

*To all whom it may concern:*

Be it known that I, ADDISON T. SAUNDERS, a citizen of the United States, and a resident of Chicopee, in the county of Hampden and State of Massachusetts, have invented certain new and useful Improvements in Apparatus for Testing Complex Liquids, of which the following is a specification.

My invention relates to apparatus for distilling.

It is designed for the distillation upon a laboratory scale of liquids of a complex nature concerning which it is desired that the relative and actual quantities of the various portions having different boiling points shall be determined together with the temperatures at which they volatilize.

A principal object of my invention is to provide means of securing more uniform and accurate records of results in the fractional distillation of liquids than are obtained by present methods.

Another object is to cheapen the making of tests of complex liquids by fractional distillation in the laboratory.

A method and apparatus at present commonly employed in making fractional distillations on a laboratory scale are as follows: The fluid to be distilled is placed in a flask so mounted or supported that heat may be applied to its under portion. A thermometer is mounted in the neck of the flask, enabling the observation of the temperatures at which various portions of the contents volatilize, and the neck of the flask also has a tube through which such volatilized portions pass over into a condenser. This condenser consists of a spiral tube, or some equivalent, surrounded by a vessel through which cold water is caused to flow. The volatilized liquid passing into the tube, is condensed by cooling and discharges into a graduated receptacle. When a distillation is to be made with such an apparatus heat is applied to the fluid in the flask, raising its temperature until the first of the distillate—that portion of the liquid having the lowest boiling point—begins to come over, or appear in the receiver. The temperature is noted and maintained until no more distillate passes over. The amount which has distilled is also recorded. The temperature is then raised through a certain interval or until the fraction which is volatilizable at this second joint begins to come over, and is again maintained without further increase until no more fluid distils. Again the temperature and the quantity of the fraction are recorded, and this procedure is continued until all the various fractions have been distilled—with the exception sometimes of a per cent. of heavy residue—and their quantities and the temperatures at which they volatilize have been recorded.

A modification of this procedure is frequently employed, as follows: The boiling is maintained, with a constantly increasing temperature and without interruption, from the beginning of distillation. The quantity which comes over while the temperature rises through a certain interval or number of degrees is collected in a receptacle, that fraction which distils while the mercury rises through a second and equal interval is collected in a second receptacle, and so on, until the distillation is completed, records being made as above.

From these records it is customary to prepare permanent ones in the form of charts showing the "curve" of the distillation, or relation of temperatures to fractions distilled through the various steps of the operation.

It will be seen that the reliability and value of such records depend upon the skill, care and accuracy of observation of the manipulator. Since the personal equation enters unavoidably into the matter more or less inaccuracy must result, making difficult the fixing or determining of standards, commercial or technical.

My invention provides means for avoiding these inaccuracies; eliminating the personal equation and securing practically uniform and exact results. It automatically and autographically charts the curve of the operation as it proceeds. It enables the carrying on of numerous distillations simultaneously by a single operator and without the constant attention required by present methods.

The manner in which I prefer to carry out my invention is illustrated in the accompanying drawings, which are somewhat in outline and partly diagrammatic.

Figure 1:
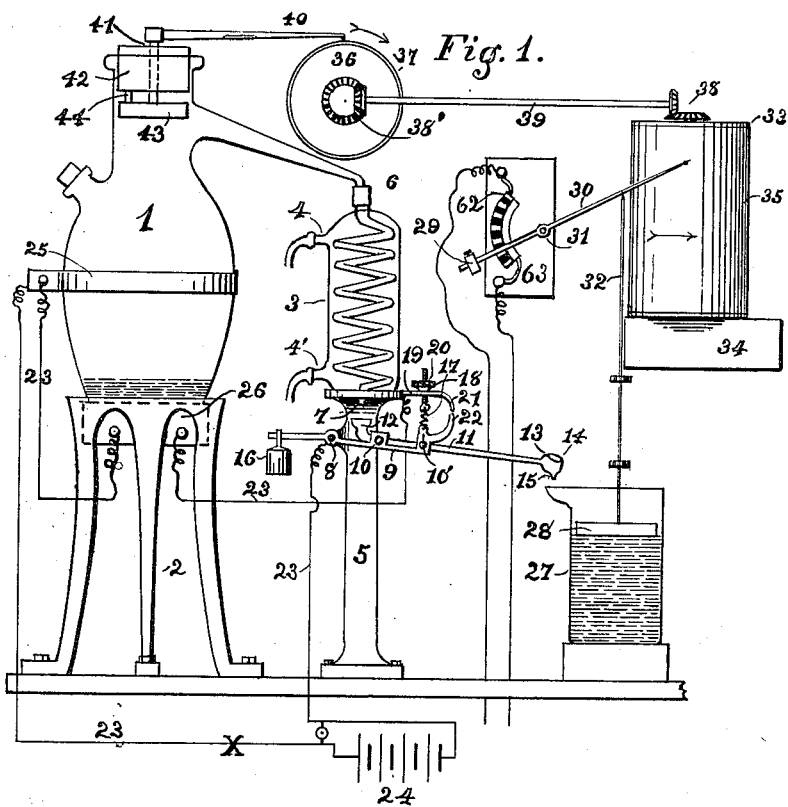
Figure 1 is a general view of an apparatus arranged and constructed in accordance with my invention.

Figs. 3 and 4 are illustrative of portions of charts of the character preferably used in my invention, and of the curves traced during the operation thereof. It will be understood that the numerals on the margins of these latter figures represent those of the charts as printed, and are indicative of divisions for degrees of temperature, periods of time and quantities of the fractions of distillate, and are not to be confused with the reference numerals of the drawings. They will, however, be separately referred to in this description.

It is not necessary to illustrate all the forms in which the invention may be carried out and I have therefore shown only the preferred apparatus for the laboratory.

In Fig. 1 the body of the still is a glass flask 1 mounted upon the support 2. 3 is a condenser of glass comprising a spiral tube or "worm" and an inclosing vessel having the inlet 4' and the outlet 4, the former being connected with a suitable source of cold water supply and the latter to waste, through flexible tubing, broken away in the drawing. The condenser is mounted upon the support 5, its spiral tube being connected at its upper extremity in the usual way with the tube leading from the head of the still at 6 and discharging at 7. Upon the support 5 is pivoted at 8 the arm 9 having clamps 10, 10' in which the tube 11 is held. This tube 11 has a funnel-shaped mouth 12 and at its other end a bulbous enlargement 13 having an opening 14 in its top and a discharging aperture 15. The arm 9 is counterbalanced by the adjustable weight 16 and the coil spring 17; this spring being attached to the arm 9 through its clamp 10' and at its upper end to the screw 18 which traverses an insulated bearing in the arm 19 and carries the knurled nut 20. The arm 19 is affixed to the support 5 but insulated therefrom. Its downcurved point 21 and the upcurved point 22 of the arm 9 form contacts in the circuit 23, 23, etc. The current for this circuit is supplied from any suitable source—dynamo or battery—indicated at 24. The arm 9 is insulated from the support 5 at the pivotal point 8, the connection of this arm with the circuit 23 being through its bearing at this point. In the circuit 23 is also the laminated thermo-electric cutout 25 mounted on the flask 1. A voltage regulator, indicated at X, may be introduced into the circuit, which also supplies the thermo-electric element—electric heater—26.

27 is a receptacle for distillate and is shown, as is also the flask 1, as containing liquid. 28 is a float borne up by the distillate and by the balancing weight 29 adjusted to that function on the shorter arm or lever of the pen arm 30 which is pivoted at 31 and connected with the float 28 by the rod 32. 33 is a cylinder rotated by the clock mechanism 34 and adapted to carry the chart 35, similar to the chart and cylinder elements of the well known forms of recording thermometers, etc. A similar cylinder, 36, bearing a similar chart 37 is driven from the shaft of the cylinder 33 at the same speed through the pairs of gears 38 and 38' and the shaft 39. The pen arm 40 is affixed to the shaft 41 which is rotatable in a suitable mounting 42 closing the mouth of the flask 1 in which it is firmly seated. To the lower end of the shaft 41 is affixed the inner extremity of the laminated coil 43, its outer extremity being affixed to the mounting 42 by the pin 44. This laminated coil 43, the pen arm 40 and the rotating cylinder 36 bearing a chart are all similar to corresponding parts in a well known form of recording thermometer, which they in fact constitute in this device.

In practice the laminated coil 43 is mounted somewhat lower in the throat of the flask than shown, to bring it into the current of vapor passing over into the outlet of the flask.

Figure 2:
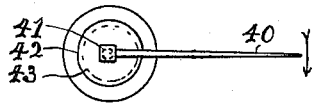
Fig. 2 shows the laminated coil 43 in plan.

For clearness of illustration and to avoid crowding in the drawing the cylinder 33 carrying the chart 35 is shown in a position relative to the float 28 making the connection of the rod 32 to be with the pen arm proper. It is obvious that the principle is the same as if the rod were connected to the short arm at an equal distance from the fulcrum 31. In this position the resultant movement of the pen would be downward as the float rises, and this is the arrangement of parts preferred in practice, the balancing weight 29 being adjusted on the pen arm proper, 30. It is in consonance with this latter arrangement of parts that the accompanying drawings of portions of charts, Figs. 3 and 4 are made. The movement of the pen arm 40 being in the direction indicated by the arrow, Fig. 2, and of the cylinders as similarly indicated in Fig. 1. It will be understood that it is immaterial whether this latter arrangement be used with the chart 35 or the cylinder 33 be located to the left of the float rod and of the fulcrum 31. If this change in relative positions of these members be made, the connection of the float rod with the pen arm would then be at the point shown in the drawing, in order that the movement of the pen should be from the lower toward the higher numbered spaces on the chart.

The operation of the apparatus is as follows:—

The liquid to be distilled is placed in the flask 1, a certain carefully measured quantity being used. The weight 16 and the spring 17 are so adjusted as to hold the contact points 21 and 22 lightly together when there is no liquid in the tube 11. Cold water is turned into the condenser 3 through the inlet 4' in continuous flow, exhausting through 4. The float 28 rests at the bottom of the receptacle 27, balanced by the weight 29. The chart 35 is placed on the cylinder 33 and the chart 37 upon the cylinder 36, the inked pens of 30 and 40 resting upon charts at proper starting points, indicated by $xp$ and $xxp$ in Figs. 3 and 4 respectively. The current from 24 is turned on through the circuit 23, steadily raising the temperature of the heater 26 and with it that of the liquid in the flask 1. As this begins to volatilize, the heated vapor acts upon the coil 43 causing the pen of arm 40 to begin to trace the line upon the chart 37 indicating and recording such rise. Simultaneously with the beginning of volatilization the clock mechanism 34 is started, rotating the cylinders 33 and 36. I may, when desirable, employ an automatic starter, electric, for the clock, actuated by the first flow of distillate in the tube, but do not wish to complicate these specifications with this in detail. As the liquid volatilizes, the vapor passes over into the condenser 3 reliquefying and discharging from the worm at 7 into the funnel shaped mouth 12 of the tube 11 and flowing into the bulbous end 13, thence through the orifice 15 into the receptacle 27. The size of the aperture 15 is such that with a rate of flow of distillate calculated to result in complete distillation of the contents of the flask 1 in the period of a single revolution of the record cylinders 33 and 36, there will be no accumulation in the bulb 13, but such that when this flow increases beyond the desired rate such accumulation occurs. The adjustment above described being such that the contact points 21 and 22 are but lightly held together when this bulb is empty, the accumulation in the latter promptly parts them by depressing the tube 11, and thus opens the heating circuit 23, thereby retarding the rise of temperature in the flask. In order that the results shall be immediate upon the temperature of the liquid in the flask, or, more accurately, upon the rate of volatilization, the heater 26 is constructed without superfluous metal, and with the electric coil in as direct and complete contact as practicable with the bottom of the flask. Any excess in the accumulation of distillate beyond the capacities of the bulb overflows through the opening 14 in the top of the same and discharges with the rest into the receptacle 27.

It will be understood that except for, and during, the interruptions of the heating current occasioned by the action of excessive flow of distillate in opening the circuit 23, as described, the temperature in flask 1 constantly increases from the beginning of the operation to its completion. In making fractional distillations of samples of such complex fluids as petroleum products, a limit is usually predetermined beyond which the heat will not be carried; observation being made of the per cent. of residue which will not come over at this point.

In my invention, the thermo-cutout 25 is set for this predetermined point and, in the event of failure of the operator to cut off the current when this temperature is reached, the cutout prevents a further rise by opening the circuit 23. This maintains the temperature at this point. One of the well known forms of circuit breakers may be introduced, if desired, into the circuit 23 and be controlled by the laminated member 25 to so break the circuit when the predetermined point is reached that it remains open.

It will be understood that as the distillate discharges into the receptacle 27 it raises the float in proportion to its quantity, operating the pen arm 30 and recording thereby the quantity, upon the chart 35; also that the pen arm 40 continues to be operated by the coil 43 as the temperature rises, and that, as the charts 35 and 37 are similarly divided into spaces representing in both certain periods of time and also in the case of chart 35 certain quantities and in that of 37 certain degrees of temperature, the curves drawn upon these two charts during an operation constitute a record, to be read conjointly, of the boiling points of the various fractions of the liquid.

In the illustrations of portions of charts, Figs. 3 and 4, curves have been drawn illustrative of curves for a hypothetical liquid. As indicated, Fig. 4 represents chart 35 and the curve is that recorded by the pen arm controlled by the float 27, while Fig. 3 represents the chart 37 with the curve recorded by the pen arm controlled by the thermo-coil 43. To make clearer the illustration, the curve of chart 35 is also indicated in dotted line upon chart 37. The charts are divided up in a usual way by lines in two directions, the curved lines having the same radii as described by the pens when the cylinders are not moving, and the straight lines which cross them having the direction of line which the pens trace when they are stationary and the cylinders rotating. The lines of numerals along the top margins of the two charts indicate intervals of time divided into periods of five minutes each, the single lines representing each one minute. The speed of the clock mechanism is regulated to bring the curved lines under the pens in consonance with these periods.

The vertical row of numerals on chart 37 indicates degrees of temperature, each line representing one degree of change from the next. The vertical row on chart 35 represents fractions of distillate. In order to bring the record of an entire operation within the range of the usual pen and cylinder, these are preferably divided as here, so that each space between lines represents two per cent. of the total liquid. The adjustment of float, rod and pen arm are made in consonance with this.

An examination of the illustrative charts shows that at the beginning of the operation the pen of the thermometer rested at *xp* (Chart 37) and the float-controlled pen rested at *xxp* (Chart 35). That is, the thermometer pen at 60, time 0, and the distillate pen at a corresponding point as to time and showing no liquid distilled. The thermo-line runs with the 0 time line to 69 degrees, showing that the mechanism actuating the cylinders had not been started while the contents of the flask warmed up to this point. The thermo-line now curves toward the next time line, showing that, with the temperature still rising, the cylinders have been set in motion. As the line for the distillate does not follow the 0 per cent. line, as would be the case if no liquid were distilling, but instead runs obliquely toward the lines indicating the first per cent. of distillation and the first minute of time, it is seen that the actuating mechanism for the cylinders was set in motion the instant of the beginning of distillation, and that this was at 69 degrees. In the next five minutes, as may be read, the temperature has risen ten degrees, to 79, while 8 per cent. of the liquid has distilled. In the five minutes next following, the temperature rises but five degrees, while twelve per cent. of liquid comes over, showing how the increased rate of flow reduces the rate of rise in temperature.

When the float 28, the single receptacle 27 and their coördinate pen arm are used, the latter may be so modified and adjusted as to record upon the same chart with the pen arm 40, different inks being used to make distinguishable the curve of one from that of the other.

Instead of the modification suggested above whereby the two pen arms record upon the same chart, two charts may be used in conjunction with a single cylinder, the latter being made of double length in order to carry both charts. One of the charts may be upon transparent paper, adapted to be overlaid or superimposed upon the other, to enable their being jointly read more conveniently. In the drawings, the float-rod 32 is shown as apparently without provision for the deviation from the vertical required by the sweep of the pen arm to which it is attached. This is because this rod is flexible, as is permitted by its being relieved from endwise pressure, or thrust, by the balancing weight 29. This rod may, however, be jointed at a point above its guides. In practice, the vapors of distillate have not been ignited by the proximity of the contacts 21, 22; but a light air current or other expedient may be employed as a precaution.

In brief, many modifications of the apparatus as shown may be made within the purview of my invention.

The statement herein as to the curves on the charts, in the drawings, representing those of the pen arms controlled by the float and the thermo-coil, should be qualified as to the upper portions of those curves, as these are drawn to illustrate the action as it would be with the current applied to the heating element 26 without the interrupting action of the current-control, and show the rate of flow of distillate increasing under the more rapid rise in temperature.

For the class of liquids requiring to be distilled under reduced pressure or *in vacuo*, the parts usually employed therefor may be used with this apparatus, the receptacles being mounted within a vacuum chamber.

I claim:—

1. In an apparatus of the class described the combination of a still, a recording thermometer comprising a marker member (40) and a chart bearing member (36), said marker member being adapted to be controlled by the volatilized contents of said still, a condenser, a receptacle for the condensed distillate, a recording element comprising a marker member (30) and a chart bearing member (33), said marker member (30) being adapted to be controlled by the flow of distillate, and a motor element operatively connected with said chart bearing members (33 and 36) whereby said two chart bearing members may be driven at predetermined speeds, all substantially as described.

2. In an apparatus of the class described the combination of a still, a recording thermometer comprising a marker member (40) and a chart bearing member (36), said marker member being adapted to be controlled by the volatilized contents of said still, a condenser, a receptacle for the condensed distillate, a recording element comprising a marker member (30) and a chart bearing member (33), said marker member (30) being adapted to be controlled by the flow of distillate, a motor element operatively connected with said chart bearing members (33 and 36) whereby said two chart bearing members may be driven at predetermined speeds, a thermo-electric element adapted to heat said still, an electric circuit for said thermo-electric element, and a make-and-break element in said circuit controlled by the flow of distillate, all substantially as described.

3. In an apparatus of the class described the combination of a still, a recording thermometer comprising a marker member (40) and a chart bearing member (36) said marker member being adapted to be controlled by the volatilized contents of said still, a condenser, a receptacle for the condensed distillate, a recording element comprising a marker member (30) and a chart bearing member (33), said marker member (30) being adapted to be controlled by the flow of distillate, a motor element operatively connected with said chart bearing members (33 and 36) whereby said two chart bearing members may be driven at predetermined speeds, a thermo-electric element adapted to heat said still, an electric circuit for said thermo-electric element, a make-and-break element in said circuit controlled by the flow of distillate, and a thermo-electric cut-out in said circuit in juxtaposition with said still and adapted to be adjusted to break said circuit when a predetermined temperature is reached in said still, all substantially as described.

In testimony whereof I have affixed my signature, in presence of two witnesses.

ADDISON T. SAUNDERS.

Witnesses:
ABRAHAM E. SNOW,
S. RICHARD CARLISLE.